United States Patent
Townsend et al.

(10) Patent No.: US 10,753,745 B2
(45) Date of Patent: Aug. 25, 2020

(54) GYROSCOPE LOOP FILTER

(71) Applicant: Atlantic Inertial Systems Limited, Plymouth, Devon (GB)

(72) Inventors: Kevin Townsend, Liskeard (GB); Andrew Clifford, Blanchardstown (IE); Nicholas Wilkinson, Plympton (GB)

(73) Assignee: ATLANTIC INERTIAL SYSTEMS LIMITED, Plymouth, Devon (GB)

( * ) Notice: Subject to any disclaimer, the term of this patent is extended or adjusted under 35 U.S.C. 154(b) by 448 days.

(21) Appl. No.: 15/545,827

(22) PCT Filed: Jan. 26, 2016

(86) PCT No.: PCT/GB2016/050157
§ 371 (c)(1),
(2) Date: Jul. 24, 2017

(87) PCT Pub. No.: WO2016/120601
PCT Pub. Date: Aug. 4, 2016

(65) Prior Publication Data
US 2018/0017388 A1     Jan. 18, 2018

(30) Foreign Application Priority Data
Jan. 26, 2015   (GB) .................................. 1501207.3

(51) Int. Cl.
*G01C 19/5776*     (2012.01)
*G01D 1/16*     (2006.01)

(52) U.S. Cl.
CPC ........... *G01C 19/5776* (2013.01); *G01D 1/16* (2013.01)

(58) Field of Classification Search
CPC .............................. G01C 19/5776; G01D 1/16
See application file for complete search history.

(56) References Cited

U.S. PATENT DOCUMENTS

| | | |
|---|---|---|
| 5,491,725 A | 2/1996 | White |
| 5,561,400 A | 10/1996 | Iguchi et al. |
| 6,553,833 B1 | 4/2003 | Funk et al. |
| 2008/0126015 A1 | 5/2008 | Hammerschmidt |

(Continued)

FOREIGN PATENT DOCUMENTS

JP   H07170152 A   7/1995

OTHER PUBLICATIONS

Wikipedia: Q Factor <https://web.archive.org/web/20141227224155/https://en.wikipedia.org/wiki/Q_factor> retrieved by archive.org on Dec. 27, 2014. (Year: 2014).*

(Continued)

*Primary Examiner* — Alexander Satanovsky
*Assistant Examiner* — Mark I Crohn
(74) *Attorney, Agent, or Firm* — Cantor Colburn LLP

(57) ABSTRACT

There is provided a method of sensing a rotation rate using a vibrating structure gyroscope, said gyroscope comprising an electronic control system comprising one or more control loops, wherein at least one of said control loops comprises a filter having a variable time constant, said method comprising the steps of: determining or estimating a characteristic of the vibrating structure of said gyroscope; and adapting or varying said time constant of said filter with the determined or estimated characteristic of said vibrating structure.

12 Claims, 3 Drawing Sheets

(56) References Cited

U.S. PATENT DOCUMENTS

2014/0000366 A1* 1/2014 Blomqvist ............. G01C 19/56
                                                73/504.12
2015/0204668 A1* 7/2015 Tazartes ................ G01C 19/00
                                                73/504.02

OTHER PUBLICATIONS

Wikipedia: Time Constant: <https://web.archive.org/web/20141229014719/https://en.wikpedia.org/wiki/Time_constant> retrieved by archive.org on Dec. 29, 2014. (Year: 2014).*
International Search Report for Application No. PCT/GB2016/050157, dated Apr. 20, 2016, 3 pages.
JP Office Action for Patent Application No. JP 2017-557502, dated Jun. 4, 2019, 8 pages.

* cited by examiner

GYROSCOPE LOOP FILTER

CROSS REFERENCE TO RELATED APPLICATIONS

This is a U.S. National Stage of Application No. PCT/GB2016/050157 filed Jan. 26, 2016, which claims the benefit of GB Application No. 1501207.3 filed Jan. 26, 2015, the disclosures of which are incorporated herein by reference.

BACKGROUND

Modern high performance Coriolis gyroscope sensors typically contain vibrating structures, for example using microelectromechanical systems ("MEMS"), which are designed to operate with very high Q-factors, or magnification factors. This results in a sensor having a very low natural bandwidth.

The Q-factor of most MEMS sensors can be highly variable, for example due to manufacturing tolerances, and can also vary in use due to, for example, temperature variations. This may result in significant variations in the Q-factor, and the natural bandwidth of the sensor, in use. In addition the resonant frequency may also have independent tolerances and temperature variations, causing similar effects on the frequency response.

Most high performance systems require some sort of frequency response shaping. A number of techniques can be used to shape the frequency response of a MEMS sensor. For example, pole-zero cancellation can be used but this may result in inconsistent responses at low frequencies.

FIG. 1 shows the above-described effects using a conventional gyroscope. When considered over the full bandwidth of interest the frequency response appears to conform to a simple second order system, but if the low frequency range is looked at in more detail it can be seen to deviate quite significantly. Low frequency gain variations 10 can be seen, which may be acceptable for low performance systems. However, these may become problematic for high performance and/or highly dynamic systems.

It is desired to provide an improved method of sensing a rotation rate using a vibrating structure gyroscope.

SUMMARY

According to the disclosure, there is provided a method of sensing a rotation rate using a vibrating structure gyroscope, the gyroscope comprising an electronic control system comprising one or more control loops, wherein at least one of the control loops comprises a filter having a variable time constant, the method comprising the steps of:

determining or estimating a characteristic of the vibrating structure of the gyroscope; and adapting or varying the time constant of the filter with the determined or estimated characteristic of the vibrating structure.

The characteristic may comprise the frequency, Q-factor or bandwidth of the vibrating structure.

The step of determining or estimating a characteristic of the vibrating structure may comprise measuring a temperature of the vibrating structure.

The step of adapting or varying the time constant of the filter may comprise tracking the characteristic of the vibrating structure. In other words, the time constant may adapt or vary when the value of the determined or estimated characteristic of the vibrating structure changes. For example, if the frequency, Q-factor, bandwidth or temperature of the vibrating structure increases, then the time constant may be increased. Similarly, if the frequency, Q-factor, bandwidth or temperature of the vibrating structure decreases, then the time constant may be decreased.

The gyroscope may comprise a primary axis and a secondary axis, and the control loop may detect and/or control motion on the secondary axis of the gyroscope, or may be configured, arranged or adapted to detect and/or control motion on the secondary axis of the gyroscope.

The method may further comprise causing the vibrating element to vibrate along the primary axis, and/or measuring the response of the vibrating element in the secondary axis so as to give a measure of the rotation rate of the gyroscope.

The step of adapting or varying a time constant of the filter may comprise modifying an output or rate measurement bandwidth of the gyroscope, for example in response to a change in the time constant of the filter.

The filter or control loop may comprises a transfer function comprising the characteristic of the vibrating structure. The transfer function may be proportional to or otherwise correlated with the characteristic of the vibrating structure.

The transfer function may be of the form:

$$TF(s) = \frac{\frac{AQ's}{\omega_n} + C}{B},$$

where A, B and C are constants, $\omega_n$ is the resonant frequency of the vibrating structure, s represents frequency and Q' is an estimated Q-factor or estimated magnification factor of the vibrating structure. Q' may be calculated using the characteristic of the vibrating structure and/or Q' may be a function of the characteristic of the vibrating structure.

The method may further comprise determining an initial time constant based on an initial value of the characteristic, and the step of adapting or varying the time constant may comprise adapting or varying the initial time constant.

The method may further comprise measuring a rotation rate of the gyroscope.

It will be appreciated that the adaptation or variation of the time constant of the filter as described above provides an improved measurement of the rotation rate. Thus, the disclosure extends to a method of measuring a rotation rate using a vibrating structure gyroscope comprising the methods or method steps described above, and may include the step of providing or outputting a value for the rotation rate of the gyroscope using the control loop, filter or electronic control system. The method may comprise displaying the value for the rotation rate, for example on a monitor.

According to the disclosure, there is provided a method of operating an Inertial Measurement Unit ("IMU") comprising a vibrating structure gyroscope, wherein the method comprises the methods of sensing a rotation rate using a vibrating structure gyroscope as described above. The method may comprise providing or outputting a value for the rotation rate of the gyroscope using the control loop, filter or electronic control system. The method may comprise displaying the value for the rotation rate, for example on a monitor.

The disclosure extends to systems arranged to carry out the methods described above, for example an electronic control system as part of, for example an Inertial Measurement Unit ("IMU"), which may itself form part of a platform guidance system, for example.

The disclosure also provides an apparatus for sensing a rotation rate using a vibrating structure gyroscope, the apparatus comprising means adapted to carry out the methods described above.

All or part of the apparatus may form part of an Inertial Measurement Unit ("IMU") and may be, for example, a data processing means within the IMU. In some embodiments, all or part of the apparatus is remote from, but is communicatively coupled with, the IMU and is, for example, a computer system (e.g. a server) comprising data processing means.

The methods according to the present disclosure may be implemented at least partially using computer programs or software code portions.

Thus, according to an aspect of the disclosure there is provided a computer program comprising code for performing the methods described above when run on data processing means.

According to another aspect of the disclosure there is provided a computer readable medium storing software code portions for performing the methods described above when run on a data processing means.

The computer readable medium may comprise a non-transitory medium, such as a CD or other optical disk, a diskette, or a hard disk, or may comprise a transitory medium such as an electronic or optical signal transmittable to a computer system, via a modem or other interface device, over either a tangible medium, including but not limited to optical or analogue communications lines, or intangibly using wireless techniques, including but not limited to microwave, infrared or other transmission techniques.

In accordance with the disclosure, there is provided a system for sensing and/or measuring a rotation rate using a vibrating structure gyroscope, said gyroscope comprising an electronic control system comprising one or more control loops, wherein at least one of said control loops comprises a filter having a variable time constant, wherein said electronic control system is arranged and adapted to:

determine or estimate a characteristic of the vibrating structure of said gyroscope; and adapt or vary said time constant of said filter with the determined or estimated characteristic of said vibrating structure.

The electronic control system may be arranged and adapted to provide and/or output a value for the rotation rate of the gyroscope, for example using the control loop, filter or electronic control system.

The system may comprise a display for displaying the value of rotation rate.

BRIEF DESCRIPTION OF THE DRAWINGS

Various embodiments will now be described, by way of example only, and with reference to the accompanying drawings in which.

DETAILED DESCRIPTION

Figure 1:
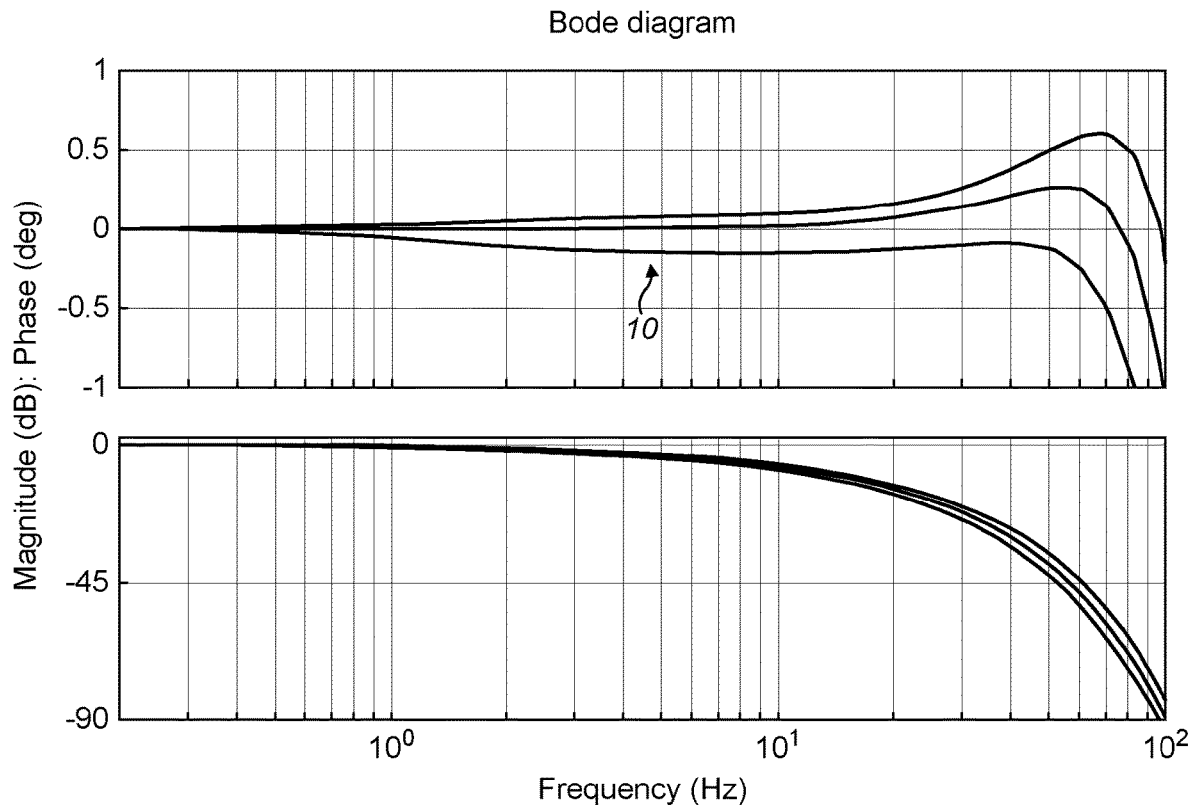
FIG. 1 shows a typical frequency response using a conventional Coriolis gyroscope loop filter.

A vibrating structure gyroscope for use in an inertial measurement unit ("IMU") in accordance with the disclosure will now be described.

Vibrating structure gyroscopes typically use the principles of the Coriolis effect to output a rotation rate, or otherwise detect rotational motion. A vibrating structure gyroscope may include a vibrating structure or sensor such as a vibrating element in the form of a mechanical resonator, such as a beam, tuning fork or ring resonator. The vibrating structure may be excited into resonance by an electromagnetic drive means, and may be fabricated using a microelectromechanical systems ("MEMS") process. Other drive means may be employed, such as those including optical, thermal expansion, piezo-electric or electrostatic effects.

The vibrating element may be caused to vibrate along a primary axis, and the response of the vibrating element in a secondary axis (which is different to the primary axis) during rotation may be used to give a measure of the rotation rate.

One or more control loops may be used to activate the primary axis and adjust the amplitude and frequency of the drive signals in order to establish the primary axis motion at its resonant frequency.

The primary axis response and the secondary axis response of the vibrating structure, such as a mechanical resonator in a spring-mass system, when considered around their resonant frequencies can each be described by the classical $2^{nd}$ order transfer function as follows:

$$TF(s) = \frac{\omega_n^2}{s^2 + \frac{\omega_n s}{Q} + \omega_n^2} \quad [1]$$

where s is the complex frequency used in Laplace transform notation, $\omega_n$ is the natural frequency of the mechanical resonator and Q is the magnification factor.

The resonant frequency of the secondary axis may be designed and adjusted to match the resonant frequency of the primary axis to a high degree of accuracy in which case the two transfer functions (for each of the primary and secondary axes) can be considered identical.

As the system is operated at its natural resonant frequency $(\omega_n)$ the response can be transformed to a baseband equivalent response by using the substitution $s=j(\omega_n+co)$ where $\omega_n$ is the natural resonant frequency and co is now the baseband (modulation) frequency of interest.

The baseband equivalent transfer function of the resonator can thus be rewritten as:

$$TF(s) = \frac{\frac{2Qs}{\omega_n}}{1 + \frac{2Q}{\omega_n}s} \quad [2]$$

which is a simple first order low pass filter with a time constant defined by $2Q/\omega_n$ and therefore a bandwidth defined by $\omega_n/2Q$.

In an example $\omega_n=100,000$, $Q=30,000$ and the time constant may typically be 0.6 seconds and the bandwidth may be 1.66 rad/s, or more conveniently expressed as 0.26 Hz.

The natural bandwidth of such a sensor may, then, be very low (0.26 Hz) and high performance, balanced systems may require an output bandwidth nearer 100 Hz. It has been found that some means of extending the bandwidth may be necessary, so that the output, or rate measurement bandwidth is larger than the natural bandwidth of the sensor.

In this regard, the electronic control system of the gyroscope may comprise one or more separate control loops to preferably detect and control the motion on the secondary axis. These control loops may also be used to modify the output, or rate measurement bandwidth, so that it may be above the natural bandwidth of the sensor and in order to suit the system requirements (for example 100 Hz).

Figure 2:
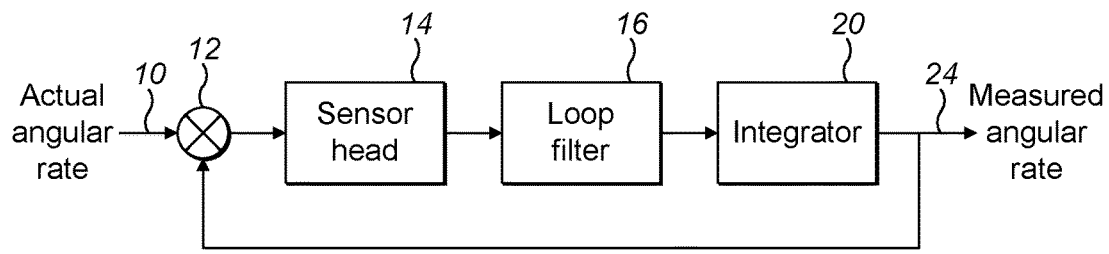
FIG. 2 shows an embodiment of a loop filter according to the disclosure.

A control loop of the electronic control system of the gyroscope is shown in FIG. 2, and may include one or more of a summing junction 12, a sensor or sensor head 14, loop filter 16, and integrator 20. The control loop may be for detecting and/or controlling motion on the secondary axis of the gyroscope. The actual angular rate may refer to the real motion that the gyroscope is trying to measure. This may also be termed input angular rate. The measured angular rate may refer to the estimate made by the gyroscope of the input angular rate, and may be referred to as the output angular rate.

The components of the loop introduce various phase lags, which together with the phase lag produced by natural bandwidth of the sensor may require the inclusion of a phase lead to provide a stable loop. Therefore the loop filter 16 may be a phase lead filter.

In accordance with the disclosure, the time constant of the loop filter 16 may be adapted or varied, preferably so as to match and track a characteristic, for example the natural bandwidth of the sensor or vibrating structure 14. The characteristic may also be or comprise frequency, Q-factor or temperature of the vibrating structure. This may advantageously provide a flat low frequency gain response and a constant, or temperature independent output bandwidth of the signal output from the control loop. In this manner, the disclosure preferably compensates for Q-factor and frequency variations, and minimises noise.

The time constant of the loop filter 16 may initially be determined based on the natural bandwidth of the vibrating structure 14 calculated from knowledge of its resonant frequency and/or nominal Q-factor. The adaptation of the time constant may then be achieved by tracking the resonant frequency and/or the Q-factor of the vibrating structure in use.

Both the resonant frequency and the Q-factor of the vibrating structure may vary significantly with its temperature. That is, there may exist a strong correlation between the resonant frequency and Q-factor of the vibrating structure with its temperature. This correlation is defined by a very simple relationship as follows:

$$Q(T) = \frac{Q_0}{1 + QTC \times (T - T_0)} \quad [3]$$

where Q(T) is the Q at any temperature T, QTC is the temperature coefficient of Q (generally a constant value of typically 0.006), $T_0$ is the reference temperature and $Q_0$ is the nominal Q at this reference temperature.

Conventionally the transfer function of a loop filter in the control loop may be determined by constants that are derived from the gyroscope and inertial measurement unit ("IMU") design in order to achieve a given bandwidth and gain peaking.

The present disclosure may improve on such arrangements by providing a transfer function for the loop filter of the closed loop that preferably adapts or varies with a determined or estimated characteristic of the vibrating structure in use, so as to adapt or vary the time constant of the loop filter in use. In one example, the transfer function TF(S) of the loop filter of the present disclosure may be represented as:

$$TF(s) = \frac{\frac{2Q's}{\omega_n} + 1}{Bs + 1} \quad [4]$$

where B is a constant, which may be derived from the gyroscope and inertial measurement unit ("IMU") design, $\omega_n$ is the resonant frequency of the vibrating structure, and Q' is an estimated Q-factor or estimated magnification factor of the vibrating structure. Q' may be a function based on one or more of the measured frequency, temperature and design parameters of the vibrating structure. In one example, Q' takes the form of Q(T) in the relationship given above in equation [3].

The time constant of the loop filter 16 may be adapted or varied, preferably so as to match and track the natural bandwidth of the vibrating structure, so as to preferably provide a constant output bandwidth for the control loop. This may have the benefit that the overall frequency response can then be optimised, for example made as large as possible, without compromising the noise and dynamic range of the system. This may minimise the effect of minor mismatches in the bandwidth of the vibrating structure and the frequency of the loop filter.

Figure 3A:
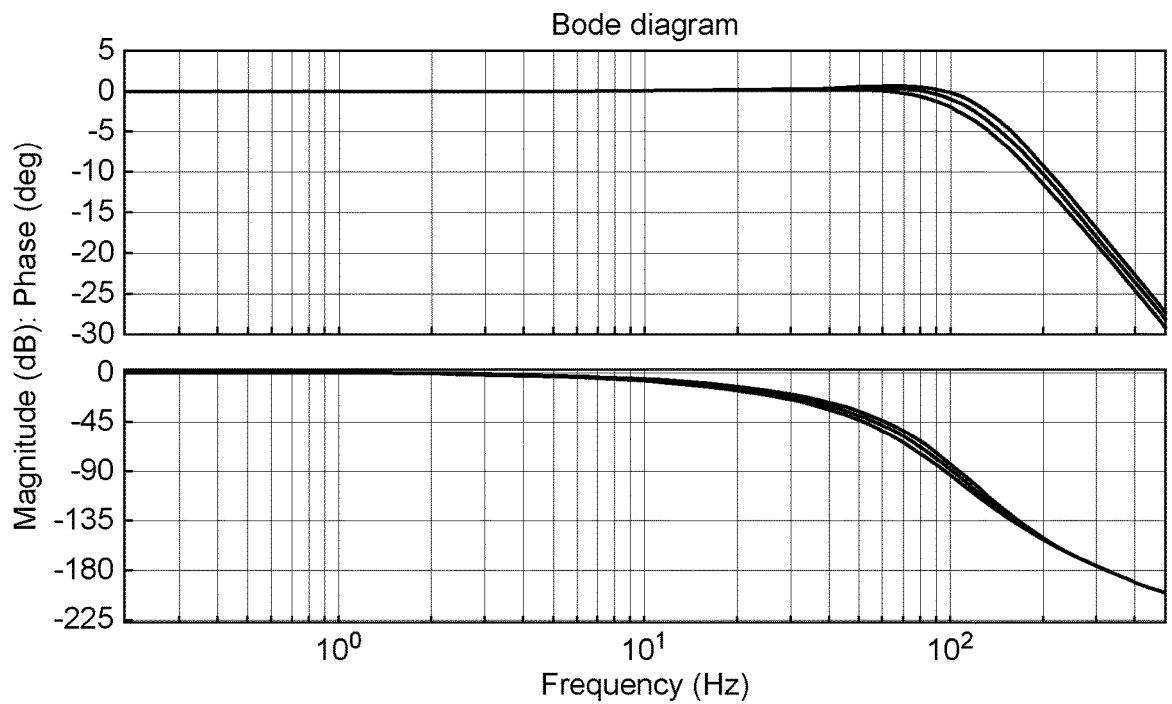
FIGS. 3a-3c show frequency responses using the loop filter of FIG. 3 in a gyroscope according to the disclosure.

FIG. 3a shows the effects of dynamically adjusting the time constant of the loop filter to match and track the natural bandwidth of the vibrating structure in accordance with the disclosure.

Figure 3B:
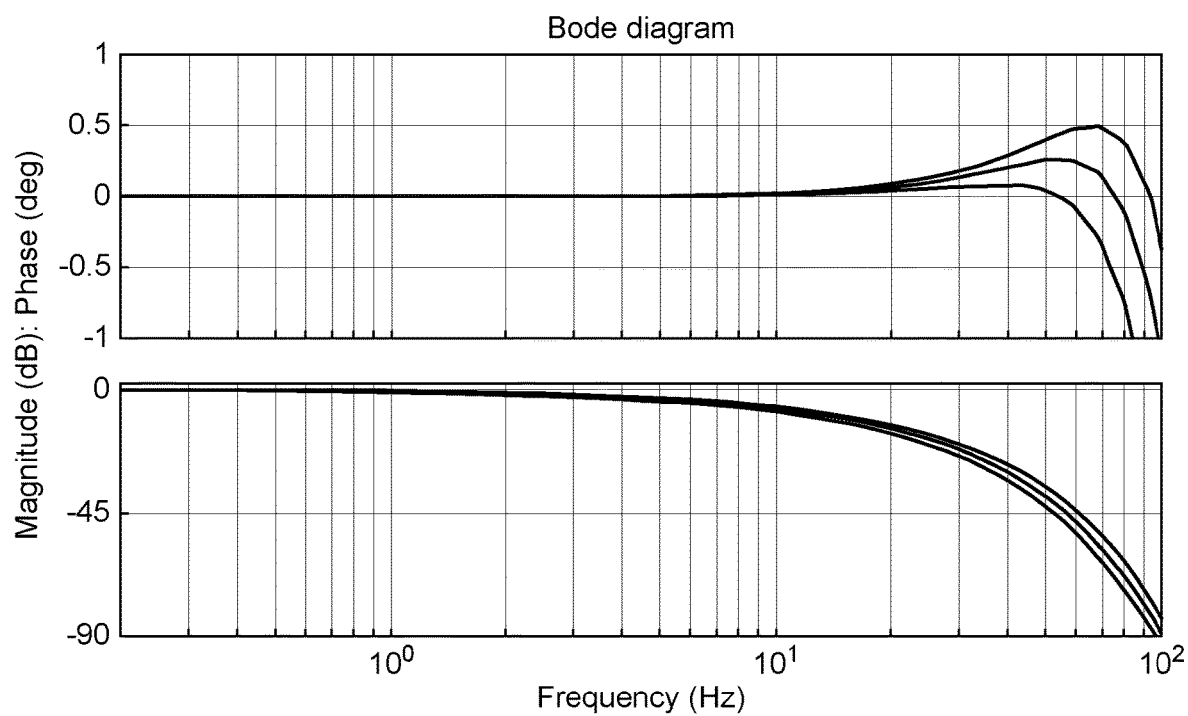

FIG. 3b shows that there are no frequency variations across the low frequency range of interest. This can be compared to a conventional response, shown in FIG. 1, in which the time constant of the loop filter does not match and track the natural bandwidth of the vibrating structure.

Figure 3C:
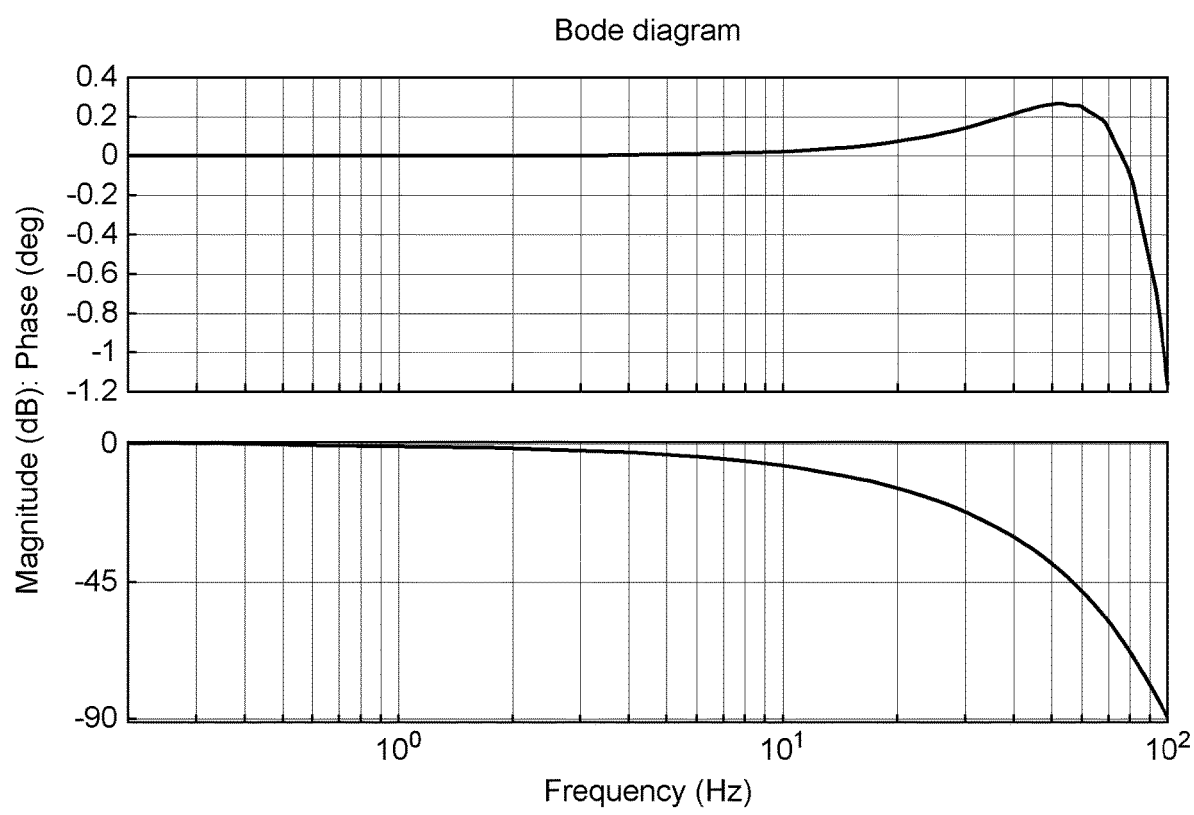

FIG. 3c shows the effects of dynamically adjusting the time constant of the loop filter to match and track the natural bandwidth of the vibrating structure in accordance with the disclosure, but with added gain compensation to provide a consistent second order response. The bandwidth and gain peaking may be adjusted using the parameters of the control loop.

The present disclosure may address the frequency response of the control loop using the recognition that the frequency response of the vibrating structure of the gyroscope (which has a dominant effect) may be related to the Q-factor of the vibrating structure, and the further recognition that the Q-factor may vary strongly with temperature.

The temperature of the vibrating structure may be measured with a suitable temperature sensor, or it may be estimated based on the frequency of the vibrating structure, which may enable a good estimate of the Q-factor of the vibrating structure in use.

This estimate of the Q-factor may be used to calculate a time constant for a filter in the control loop so as to preferably compensate for the variation of the Q-factor of the vibrating structure over time. This improved time constant can then be used to improve or optimise the frequency response of the control loop or gyroscope.

The Q-factor of the vibrating structure is correlated with resonant frequency and bandwidth and these could be referred to in place of Q-factor in the above discussion as well.

Although certain embodiments have been described, it will be understood by those skilled in the art that various changes in form and detail may be made without departing from the scope of the disclosure as set forth in the accompanying claims.

The invention claimed is:

1. A method of sensing a rotation rate using a vibrating structure gyroscope, said gyroscope comprising an electronic control system comprising one or more control loops, wherein at least one of said control loops comprises a filter having a variable time constant, said method comprising the steps of:
   determining or estimating a natural bandwidth of the vibrating structure of said gyroscope; and
   adapting or varying said time constant of said filter so as to match and track the determined or estimated natural bandwidth of said vibrating structure, so as to provide a constant output bandwidth for the control loop.

2. The method as claimed in claim 1, wherein said step of determining or estimating a characteristic of said vibrating structure comprises measuring a temperature of said vibrating structure.

3. The method as claimed in claim 1, wherein said gyroscope comprises a primary axis and a secondary axis, and said control loop detects and/or controls motion on said secondary axis of said gyroscope.

4. The method as claimed in claim 3, further comprising causing said vibrating element to vibrate along said primary axis, and measuring the response of the vibrating element in said secondary axis so as to give a measure of the rotation rate of the gyroscope.

5. The method as claimed in claim 1, wherein said adapting or varying a time constant of said filter modifies an output or rate measurement bandwidth of said gyroscope.

6. The method as claimed in claim 1, wherein said filter or control loop comprises a transfer function comprising said characteristic of said vibrating structure.

7. The method as claimed in claim 6, wherein said transfer function is proportional to or otherwise correlated with said characteristic of said vibrating structure.

8. The method as claimed in claim 7, wherein Q' is calculated using said characteristic of the vibrating structure.

9. The method as claimed in claim 6, wherein said transfer function is of the form:

$$TF(s) = \frac{\frac{AQ's}{\omega_n} + C}{B},$$

where A, B and C are constants, $\omega_n$ is the resonant frequency of the vibrating structure, s represents frequency and Q' is an estimated Q-factor or estimated magnification factor of the vibrating structure.

10. The method as claimed in claim 1, further comprising determining an initial time constant based on an initial value of said characteristic, and wherein said adapting or varying said time constant comprises adapting or varying said initial time constant.

11. The method as claimed in claim 1, further comprising measuring a rotation rate of said gyroscope.

12. A system for sensing a rotation rate using a vibrating structure gyroscope, said gyroscope comprising an electronic control system comprising one or more control loops, wherein at least one of said control loops comprises a filter having a variable time constant, wherein said electronic control system is arranged and adapted to:
   determine a natural bandwidth of the vibrating structure of said gyroscope; and
   vary said time constant of said filter so as to match and track the determined natural bandwidth of said vibrating structure, so as to provide a constant output bandwidth for the control loop.

* * * * *